United States Patent
Rosa

[11] 3,804,538
[45] Apr. 16, 1974

[54] APPARATUS AND METHOD OF SHAPING BALL POINT PEN REFILLS

[76] Inventor: Anthony G. Rosa, 216 Post Ave., Lyndhurst, N.J. 07071

[22] Filed: Oct. 6, 1972

[21] Appl. No.: 295,604

[52] U.S. Cl. ............................................ 401/209
[51] Int. Cl. ............................................ B43k 7/00
[58] Field of Search ...... 401/209, 217, 210; 29/505, 29/516, 517; 46/16, 22; 161/22, 28, 29, 30, 32; 35/18 A; 264/266, 269, 274, 295–296

[56] References Cited
UNITED STATES PATENTS
2,829,623   4/1958   Barnes .............................. 401/210
3,119,377   1/1964   Johmann ........................... 401/201

*Primary Examiner*—Lawrence Charles
*Attorney, Agent, or Firm*—Kirschstein, Kirschstein, Ottinger & Frank

[57] ABSTRACT

The essence of the invention resides in the ability to form varying types of shapes having a radius of curvature in plastic tubing, such as at the rear end of a ball point refill, despite the fact that the plastic material has a memory. The invention comprises the insertion, in the back of the hollow tubular member of a ball point pen refill, a rod having a crimped end which is adapted to be urged against the interior surface of a channel formed in the hollow tubular member. The rod is smaller in diameter than the diameter of the channel so that air may proceed around the rod from the open end of the hollow tubular member and impinge upon ink contained in the hollow tubular member itself. The rear end of the refill tube may be formed in a jig bending the rod into such forms as desired and the rear end of the hollow tubular member will be held in such shape.

5 Claims, 6 Drawing Figures

PATENTED APR 16 1974   3,804,538

APPARATUS AND METHOD OF SHAPING BALL POINT PEN REFILLS

BACKGROUND OF THE INVENTION

1. Field of the Invention

The present invention relates to a new and unique means of forming ball point pen refills into varying shapes.

2. Description of the Prior Art

Heretofore numerous attempts have been made to form or to curve the plastic tubular material which is used in the making of ball point pen refills. Because of the economics involved inexpensive plastics are required and such plastics must be flexible in nature and yet must maintain their linear structure so that ink within the tube can flow freely. To this end plastics were used which were inexpensive to obtain and to form into plastic tubing, as well as the nature of the material did not permit the distortion of the tube into different geometric shapes. In short, the plastic tubing had a memory so that if bent into a torturous shape the tubing itself would revert back to the original shape it had taken.

In the formation of ball point pens, as a novelty item, it is desirous at times to permit the formerly linear ball point refill to take on various forms. Heretofore this could be done but only by using expensive procedures and methods in such a manner that the material would maintain the newly shaped form.

As a novelty item, however, the costs become paramount in the manufacture thereof and the novelty item is economically unfeasible if the cost of manufacturing is too high. What I have done with my present invention is to permit the shaping of the standard ball point refill in such a manner that it will maintain the shape desired without involving expensive manufacturing procedures and processes.

Another situation which my procedure overcomes is the fact that in all ball point refill pens atmospheric pressure must be directed against the ink which is disposed in the refill tube. This provision for atmospheric pressure on the rear surface of the ink in the hollow tubular member permits flowing of the ink to the tip of the pen. Because of this requirement air holes are usually required either in the barrel of the ball point pen or in the hollow tubular member of the ball point refill.

SUMMARY OF THE INVENTION

1. Purposes of the Invention

It is the general object of the present invention to avoid and overcome the foregoing and other objections and deficiencies in prior art devices by providing a simple and economic means of shaping the rear end of a ball point refill.

Another object of the present invention is to provide a small diameter rod which is insertable in a channel in the rear end of the ball point refill so that in bending or shaping the rear end of the refill the rod will be bent and shaped to the same form and thereby hold the plastic tubing in that form.

Yet a further object of the present invention is to provide a rod which will aid in the formation of an odd shape at the rear end of a ball point pen refill and at the same time permit air to flow in through the hollow tubular member of the ball point refill tube to impinge upon the ink contained therein.

Still another object of the present invention is to provide a method of insertion of a rod in the rear end of a plastic tube which will permit the shaping and forming of the rear end of that tube and yet permit the flow of air thereinto.

Still a further object of the present invention is to provide a means for shaping the rear end of a ball point refill pen and to permit a rod to be held in poisition within the tube by providing protrusions thereon which fix the rod in position within the tube.

Yet a further object of the present invention is to shape and form existing ball point pen refills without the necessity of changing from one plastic material to another and re-manufacturing those very same ball point refill pens.

2. Brief Description of the Invention

The above objects of the present invention which will become apparent as the description proceeds are achieved by providing a ball point pen refill in which a hollow tubular member is formed into a predetermined shape the invention comprising the hollow tubular member being of a plastic material having a memory, a rod insertable in said tubular portion, said rod having an outside diameter smaller than the inside diameter of the channel formed in the hollow tubular member, said rod being provided with a pair of protrusions extending laterally therefrom, each of said protrusions engaging the interior of the channel in the hollow tubular member when said rod is inserted through the open end of said hollow tubular member, means for forming the rear end of said tubular member into a predetermined shape such that the rod will maintain said shape and is of sufficient tensil strength to resist the urgings of the plastic tubular member to return to its original shape.

BRIEF DESCRIPTION OF THE DRAWINGS

For a better understanding of the preferred and alternative embodiments hereinafter described, reference should be had to the accompanying drawings wherein like numerals of reference indicate similar parts throughout the respective views and wherein.

DESCRIPTION OF THE PREFERRED EMBODIMENTS

The following specification relates to a means of forming the rear end of a ball point pen refill into differing shapes and its description is limited thereto.

Figure 1:
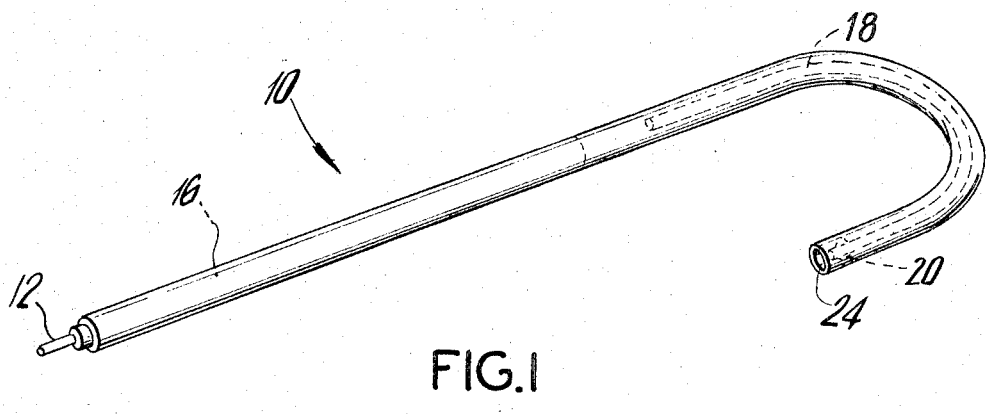
FIG. 1 is a perspective view of a ball point pen refill.
Figure 2:
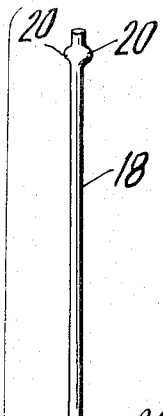
FIG. 2 is a perspective view of the ball point pen refill before it is shaped and showing a rod being inserted therein.

As shown in FIG. 1, the preferred embodiment, a ball point pen refill is formed into the shape of a miniature walking cane 10. The ball point pen refill is comprised of two basic elements that is the tip 12 and the hollow tubular member 14 into which ink 16 is subsequently injected to permit the refill to write. The ink 16 must have access to atmospheric pressure so that the ink will flow freely to the ball point tip 12. As shown in FIG. 2 a rod 18 is provided which is made of such material that it may take varying forms and maintain the form after it has been so shaped. I prefer using metals such as steel, aluminum or copper although other forms of materials such as plastics can be used to accomplish the same shape forming function. The rod 18 generally is of a small diameter and is provided with two laterally extending protrusions 20. The protrusions 20 may be formed by crimping or squeezing flat one end of the rod 18. The purposes of such protrusions will become more apparent as the description proceeds.

Figure 3:
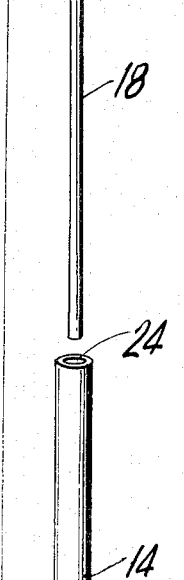
FIG. 3 is a cross-sectional view of a tubular portion of the ball point refill with the rod inserted.

As shown in FIGS. 2 and 3 the tubular member 14 is hollow and is provided with a central bore or channel 22 into which ink 16 is urged to form the writing instrument of the refill 10. The interior diameter of the bore is larger than diameter of the rod 18. However, as shown in FIG. 3 when the rod is inserted into the open end 24 of the hollow tubular member 14, of the refill 10, the laterally extending protrusions 20 will be in contact with the interior surface 26 of the channel 22 so that the rod 18 will be held in position within the rear end 28 of the tubular member 14. In this manner when the rod 18 is inserted in the open end 24 and into the channel 22 of the hollow tubular member 14 the protrusions 20 engage the interior surface 26 of the bore 22 the rod will be held in position within the bore 22 of the refill 10.

Figure 4:
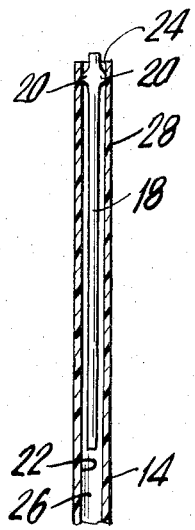
FIG. 4 is a cross-sectional view showing the rear end of the ball point pen tubular member after a predetermined shape has been formed.

If the rear end 28 of the hollow tubular member 14 were placed in a jig (not shown) the jig would form the rear end 28 of the tubular member 14 into the desired shape. As shown in FIGS. 1 and 4 the desired shape preferred is that of a cane, however, the shaping is not limited to the one that is shown in the drawings here as will be seen in FIG. 5 an alternative embodiment. However, when the rear end 28 is placed in the jig and the rear end 28 is bent into the preferred shape and the refill is removed from the jig the rear end of the refill 10 will maintain its position because the tensile strength of the bent of formed rod 18 is sufficient to overcome the strength of the plastic material which is attempting to return the tubular shape to its straight or previously formed condition. In this manner however the rear end 28 of the tubular member 14 will retain the shape into which the rod 18 has been formed.

As shown in FIGS. 3 and 4 even with the rod 18 in the straight or bent form, the rod 18 inserted in the hollow tubular member, air is permitted to enter into the bore 22 and flow around the rod 18 and thereby permits atmospheric pressure to exist within the bore 22 at the surface of the ink 16.

Figure 5:
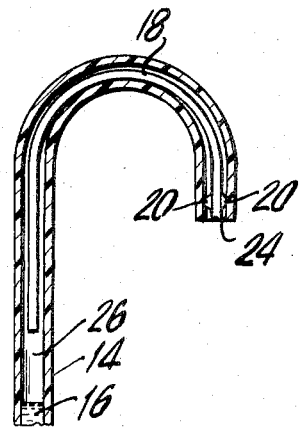
FIG. 5 is an alternative embodiment of the pen of FIG. 1 showing a different form and shape given to the rear end of the ball point pen refill.
Figure 6:
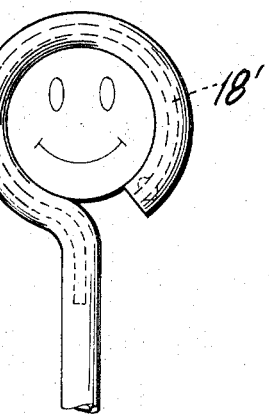
FIG. 6 is a further embodiment showing a barrel used in conjunction with the ball point pen refill.
Figure 6:
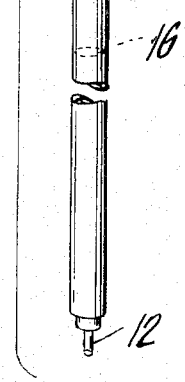
Figure 6:
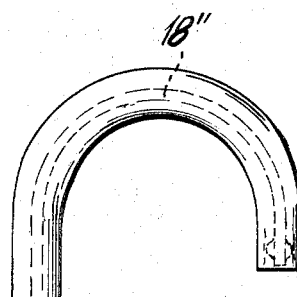

In forming the shape shown in FIGS. 1, 5 and 6, using the rod 18 to maintain those shapes, it is imperative that the rod be of sufficient length that a portion thereof remains straight along the longitudinal axis of the hollow tubular member 14. In this manner, the straight portion of the tubular member 14 of the refill 10 holds its original shape so that ink may flow normally and naturally to the tip 12.

Although I show the rod 18 as being solid, it should be understood that the rod 18 may take a tubular form, that is, have a hollow center portion. In any case, the primary consideration is that the rod must be capable of maintaining its shape even under the pressure of the plastic to return to its prior configuration.

In operation the rear end of a plastic ball point pen refill may be formed into various curved shapes by providing the hollow tubular member 14 with a bore 22 therein which has a fixed diameter; a rod 18 is cut a predetermined length and one end thereof is crimped to form the pair lateral protrusions 20 such that the outside diameter of the rod 18 is smaller than the inside diameter of the bore 22 but the outside measurement across the lateral protrusions 20 is the same or slightly larger than the interior diameter of the bore 22 so that the rod 18 may be urged into the open end 24 of the hollow tubular member 14 in such a way that the laterally extending portions 20 of the rod 18 engage the interior surface 26 of the bore 22 and holds the rod 18 in position therein; the rear end 28 of the hollow tubular member 14 is thereafter placed in a jig and formed into the shape prescribed by the jig and thereafter the jig releases the tubular member and the refill maintains the prescribed shape.

Alternatively it may be seen that varying shapes may be obtained such as that shown in FIG. 5 where the rod 18', shown in phantom, permits a circular configuration formed at the rear end 28' of the tubular member 14' and a placard or disc may be inserted therein. The principle of the formation of the rear end 28' of the ball point pen refill which is shown in FIG. 5 is identical to that described with respect to the preferred embodiment.

It should be understood by those skilled in the art that varying shapes may be used other than the cane shape or circular rear end shown in FIG. 5 and there are no limitations except as to the limitations permissably used with respect to the material of the rod and the material of the plastic tubular member.

A further alternative embodiment is shown in FIG. 6 wherein a barrel 30 is used to house the ball point pen refill 14'' and the exterior barrel section is formed in the identical means described with respect to FIG. 1 and 5 except that in this case the ball point pen refil 14'' is replaceable. The exterior or barrel 30 which houses the ball point pen refill 14'' is formed in the identical manner treated above in describing the manufacturing process.

It will be recognized by those skilled in the art that the objects of the present invention have been achieved by providing a unique means of forming the rear end of the open end of a ball point pen refill and forming the same in cooperation with the use of a rod such that the rear end of the tubular member may be formed into a desired shape and yet permit air to enter into a bore contained in the tubular member so that atmospheric pressure is available within the tube.

While in accordance with the patent statutes a preferred and alternative embodiments have been described in detail it should be particularly understood that this invention is not limited thereto or thereby.

I claim:

1. A ball point pen refill having a tip and plastic tubular member formed into a predetermined shape comprising said tubular member having a bore therein with a fixed diameter, a rod having a diameter smaller than said bore, said rod being provided with a pair of protrusions at the rear end thereof, said rod having an outside diameter smaller than the inside diameter diameter of said bore, but having a diameter equal to said bore at the extremities of the later protrusions, said tubular member being straight, said rod insertable in said tubular member such that the lateral protrusions engaging the interior surface of said bore, means for forming said rod into a predetermined shape, and means for permitting air to pass around said rod into said bore.

2. A ball point pen refill according to claim 1 wherein said means for permitting air to enter into said bore comprises said laterally extending protrusions.

3. A ball point pen refill according to claim 2 wherein said bore permits the introduction of ink thereinto and the distance between the exterior diameter of said rod and the interior diameter of said bore will not permit ink to flow back therefrom.

4. A ball point pen refill in accordance with claim 3 wherein said rod is composed of a metallic material.

5. A ball point pen refill in accordance with claim 1 wherein said rod is hollow.

* * * * *